US012188438B1

(12) United States Patent
Delgado

(10) Patent No.: US 12,188,438 B1
(45) Date of Patent: Jan. 7, 2025

(54) AIR INTAKE SYSTEM HAVING A DETACHABLE WINDOW FOR VIEWING THE AIR FILTER

(71) Applicant: Injen Technology Company, Ltd., Montclair, CA (US)

(72) Inventor: Ron Delgado, Montclair, CA (US)

(73) Assignee: INJEN TECHNOLOGY COMPANY, LTD., Montclair, CA (US)

(*) Notice: Subject to any disclaimer, the term of this patent is extended or adjusted under 35 U.S.C. 154(b) by 0 days.

(21) Appl. No.: 18/385,053

(22) Filed: Oct. 30, 2023

(51) Int. Cl.
*F02M 35/00* (2006.01)
*F02M 35/02* (2006.01)
*F02M 35/024* (2006.01)
*F02M 35/08* (2006.01)

(52) U.S. Cl.
CPC ........ *F02M 35/08* (2013.01); *F02M 35/0205* (2013.01); *F02M 35/024* (2013.01)

(58) Field of Classification Search
CPC ............ B02D 46/0002; B02D 46/0005; B02D 46/2411; B01D 2275/201; B01D 2279/60; F02M 35/0201; F02M 35/0202; F02M 35/02475; F16L 21/002
See application file for complete search history.

(56) References Cited

U.S. PATENT DOCUMENTS 4,688,511 A * 8/1987 Gerlach .................. G01L 19/12 116/271
4,826,517 A * 5/1989 Norman ............... F02M 35/024 264/516
9,440,175 B2 * 9/2016 Niakan ............ F02M 35/02475
D899,462 S * 10/2020 Niakan ............................ D15/5
D917,568 S * 4/2021 Niakan ............................ D15/5
2001/0049963 A1 * 12/2001 Berry, III ........... B01D 46/0086 73/715
2006/0260469 A1 * 11/2006 Miyagishima ... F02M 35/02483 55/385.3
2007/0193562 A1 * 8/2007 Betcher .................. F02M 31/13 123/549
2009/0084344 A1 * 4/2009 Fasan ............... F02M 35/10144 55/385.3
2017/0296956 A1 * 10/2017 Ishida ....................... B04B 7/04
2019/0388820 A1 * 12/2019 Niakan .............. F02M 35/0201

* cited by examiner

*Primary Examiner* — Phutthiwat Wongwian
*Assistant Examiner* — Sherman D Manley
(74) *Attorney, Agent, or Firm* — Myers Andras Ashman Bisol LLP; Joseph C. Andras

(57) ABSTRACT

An automobile air intake system that has a detachable transparent window assembly for visually inspecting the air filter is contemplated. A user may inspect the air filter by viewing the air filter through the transparent window assembly. Alternatively, the user may remove the window assembly from the air intake system to provide an unobstructed view of the filter. The window assembly may be releasably secured to an airbox with magnets and magnetic materials. The airbox and window assembly may be contoured about the air filter, to provide a larger section of the filter to be viewed and inspected.

20 Claims, 8 Drawing Sheets

AIR INTAKE SYSTEM HAVING A DETACHABLE WINDOW FOR VIEWING THE AIR FILTER

BACKGROUND OF THE INVENTION

1. Field of the Invention

The present invention relates in general to air intake systems for internal combustion engines. More particularly, the invention is directed to air intake systems for internal combustion engines having detachable transparent windows for viewing and inspecting air filters.

2. Description of the Related Art

Aftermarket cold air intake systems may be employed to boost performance for an automobile internal combustion engine. Many air intake systems rely on air filters to trap air contaminants. Air filters need to be visually inspected periodically and replaced as necessary to ensure peak engine performance. Many conventional air intake systems require the air intake systems to be disassembled in order for the user to inspect the air filter. However, the disassembly of the air intake system placed in the engine cavity is often time consuming and challenging.

Accordingly, a need exists to provide an air intake system that facilitates the inspection of air filters without the need to dissemble the air intake system.

SUMMARY OF THE INVENTION

In the first aspect, an air intake system for an internal combustion engine is disclosed. The air intake system comprises a cold air intake for receiving cold air, a tube for directing filtered air to an internal combustion engine, an airbox having an airbox aperture, the airbox adapted to receive and secure a conically-tapered filter, the airbox configured to accept cold air from the cold air intake, direct the air though a filter, and provide filtered air through the tube leading to the internal combustion engine, and a removable window assembly configured to be received by and releasably attach to the airbox aperture of the airbox. A portion of the outer surface of the airbox proximal to the aperture and a window outer surface of the window assembly are contoured forming a partial conical taper approximately equidistant from the filter conical taper.

In a first preferred embodiment, the window assembly comprises a window housing comprising a window frame and a transparent window, the window frame surrounding the transparent window and a first type of magnetic material secured to the window frame. The airbox further preferably comprises a second type of magnetic material secured proximal to a perimeter of the airbox aperture of the airbox. The first type of magnetic material is magnetically attracted to the second type of magnetic material. The first type of magnetic material secured to the window frame preferably comprises a plurality of discrete magnets secured to the window frame, and the second type of magnetic material secured proximal to the perimeter of the airbox aperture comprises a plurality of metal plugs formed proximal to the perimeter of the airbox aperture. Each metal plug of a plurality of the metal plugs formed on the airbox are positioned to align with and magnetically attract a corresponding discrete magnet of the plurality of discrete magnets when the airbox receives and secures the window assembly in place.

The airbox further preferably comprises a recess surrounding the aperture perimeter of the airbox aperture the recess shaped to receive and surround the window assembly such that the outer surface of the window housing is generally flush with the airbox outer surface of a portion of the airbox proximal to the aperture. The airbox aperture is preferably positioned proximal to the tube for directing filtered air to the internal combustion engine. The airbox aperture and window assembly are preferably shaped as an isosceles triangle having radiused corners. One or more keyways are preferably formed on the window housing, the keyways shaped to align the window assembly with the airbox aperture as the window assembly is placed onto the airbox. The air intake system is preferably an aftermarket product. The air intake system is preferably customized for specific automobiles. A window notch is preferably formed in the window assembly and an aperture notch is formed proximal to the aperture to facilitate the separation of the window assembly to the airbox.

In a second aspect, an air intake system for an internal combustion engine is disclosed. The air intake system comprises a cold air intake for receiving cold air, a tube for directing filtered air to an internal combustion engine, an airbox having an airbox aperture, the airbox adapted to receive and secure a filter, the airbox configured to accept air from the cold air intake, direct the air though a filter, and provide filtered air through the tube to the internal combustion engine, and, a removable window assembly configured to releasably attach to the airbox aperture of the airbox.

In a second preferred embodiment, the window assembly comprises a window housing comprising a window frame and a transparent window, the window frame surrounding the transparent window, and a first type of magnetic material secured to the window frame. The airbox preferably further comprises a second type of magnetic material secured proximal to a perimeter of the airbox aperture of the airbox. The first type of magnetic material is magnetically attracted to the second type of magnetic material. The first type of magnetic material secured to the window frame preferably comprises a plurality of discrete magnets secured to the window frame. The second type of magnetic material secured proximal to the perimeter of the airbox aperture preferably comprises a plurality of metal plugs formed proximal to the perimeter of the airbox aperture. Each metal plug of a plurality of the metal plugs formed on the airbox are preferably positioned to align with and magnetically attract a corresponding discrete magnet of the plurality of discrete magnets when the airbox receives and secures the window assembly in place.

The airbox further preferably comprises a recess surrounding the aperture perimeter of the airbox aperture, the recess shaped to receive and surround the window assembly such that the outer surface of the window housing is generally flush with the airbox outer surface of a portion of the airbox proximal to the aperture. The airbox aperture is positioned proximal to the tube for directing filtered air to the internal combustion engine. One or more keyways are preferably formed on the window housing, the keyways shaped to align the window assembly with the airbox aperture as the window assembly is placed onto the airbox. The air intake system is preferably an aftermarket product. The air intake system is preferably customized for specific automobiles. A window notch is preferably formed in the window assembly and an aperture notch is formed proximal to the aperture to facilitate the separation of the window assembly to the airbox.

In a third aspect, an air intake system for an internal combustion engine is disclosed. The air intake system comprises a cold air intake for receiving cold air, a tube for directing filtered air to an internal combustion engine, an airbox having an airbox aperture positioned proximal to a top a of the airbox near the tube for directing filtered air to the internal combustion engine, the airbox adapted to receive and secure a conically-tapered filter, the airbox configured to accept air from the cold air intake, direct the air though a filter, and provide filtered air through the tube leading to the internal combustion engine, and, a removable window assembly configured to be received by and releasably attach to the airbox aperture of the airbox, the window assembly having a window housing comprising a window frame and a transparent window, the window frame surrounding the transparent window. A portion of the outer surface of the airbox proximal to the aperture and a window outer surface of the window housing are contoured forming a partial conical taper approximately equidistant from the filter conical taper. The airbox further comprises a recess surrounding the aperture perimeter of the airbox aperture, the recess shaped to receive and surround the window assembly such that the outer surface of the window housing is generally flush with the airbox outer surface of a portion of the airbox proximal to the aperture. A window notch is formed in the window assembly and an aperture notch is formed proximal to the aperture to facilitate the separation of the window assembly to the airbox. The air intake system is an aftermarket product.

These and other features and advantages of the invention will become more apparent with a description of preferred embodiments in reference to the associated drawings.

DETAILED DESCRIPTION OF THE PREFERRED EMBODIMENTS

Many car enthusiasts seek to achieve better engine performance of their vehicles. For example, these enthusiasts may install an aftermarket cold air intake systems onto their engines which may improve engine performance in terms of increased horsepower, torque, and fuel efficiency. In addition to enhanced engine performance, the air intake systems cause the cars to emit a unique sound resulting from the cold air rushing into the engines, which many users enjoy. These air intake systems are often custom sized for specific automobiles and can be readily installed by many do-it-yourselfers.

Conventional air intake systems rely on air filters to remove contaminants from the air. Air filters are typically either in the form of Dry Filters, which may have paper or foam elements, or in the form of Oiled Filters which require air to flow through a material that has a thin coating of oil. Both types of filters require frequent inspection to determine whether replacement or cleaning of the filter is necessary to avoid engine performance issues.

Unfortunately, conventional air intake systems do not facilitate the convenient inspection of the air filters. Many conventional air intake systems fully enclose the air filter, which requires the user to disassemble the air intake system. Other air intake systems may employ transparent, permanently affixed windows for viewing the air filters, but these conventional windows often become obstructed as a result of the build-up of air contaminants in the intake systems. In both of these situations, the user must disassemble the air intake system to gain access to the air filter, which is time-consuming and inconvenient.

In an embodiment, an air intake system having a detachable transparent window for visually inspecting the air filter is contemplated. A user may either view the air filter through the transparent window or may easily remove the transparent window from the air intake system for an unobstructed view of the air filter when the transparent window may become opaque and coated with air contaminants.

In a preferred embodiment, the transparent window is releasably secured to the air intake system using magnets. If the window is clean and unobstructed, the user may view the air filter through the window to determine whether replacement or cleaning of the filter is necessary. If, on the other hand, the view through the window is obstructed, the user may simply detach the window from the air intake assembly quickly and without the use of tools. In either situation, the user no longer needs to disassemble the air intake system to visually inspect the air filter.

Figure 1:
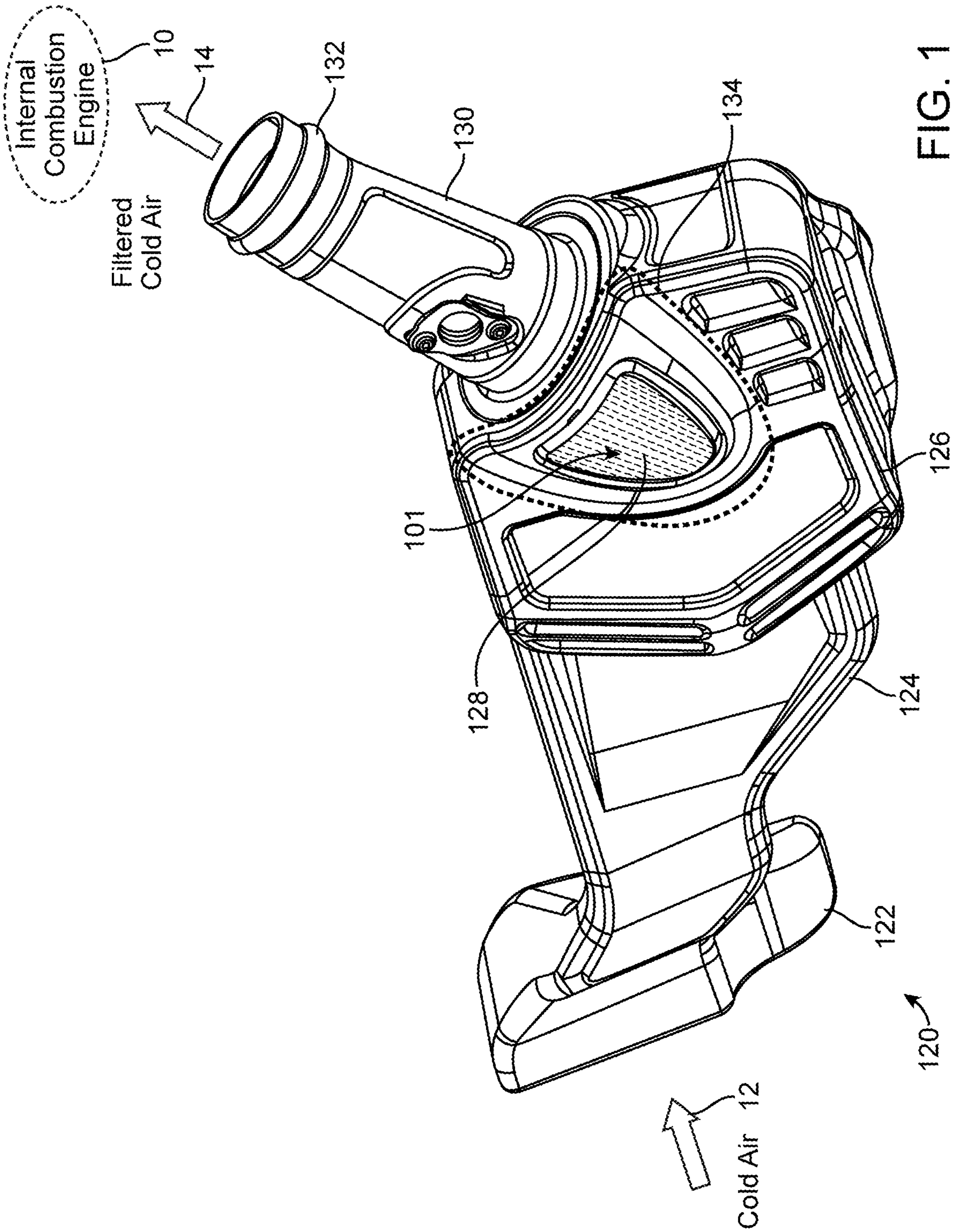
FIG. 1 is a perspective view of an air intake system in one or more embodiments.

FIG. 1 is a perspective view of an air intake system 120 for an internal combustion engine 10 in one or more embodiments. The air intake system 120 comprises a cold air intake 122 for receiving cold air 12, an intake air duct 124, an airbox 126, a window assembly 101 for inspecting the an filter 128, and a tube 130 for directing the filtered air 14 to an internal combustion engine 10. The cold air intake 122 may be positioned near the grill of a vehicle (not shown), distal from the engine 10, to collect cooler air 12 from outside the vehicle.

Hence, cold air 12 is collected by the cold air intake 122, passes through the cold air intake 122, enters the airbox 126, and then passes through the air filter 128 where the contaminants are removed from the cold air 12. The cold air is routed through the tube 130 where the filtered air 14 is fed into the internal combustion engine 10.

In an embodiment, the air intake system 120 is an aftermarket product that is customized for specific automobiles. The term "aftermarket" refers to products that are non-OEM ("Original Equipment Manufacturer") that include non-factory accessories and parts that are installed after the sale of the vehicle by the OEM. However, while air intake system 120 which are aftermarket products customized for specific vehicle are illustrated in embodiments described herein, it shall be understood that OEM air intake systems 120 or air intake systems 120 which are designed for multiple vehicles are contemplated in one or more embodiments.

Figure 2:
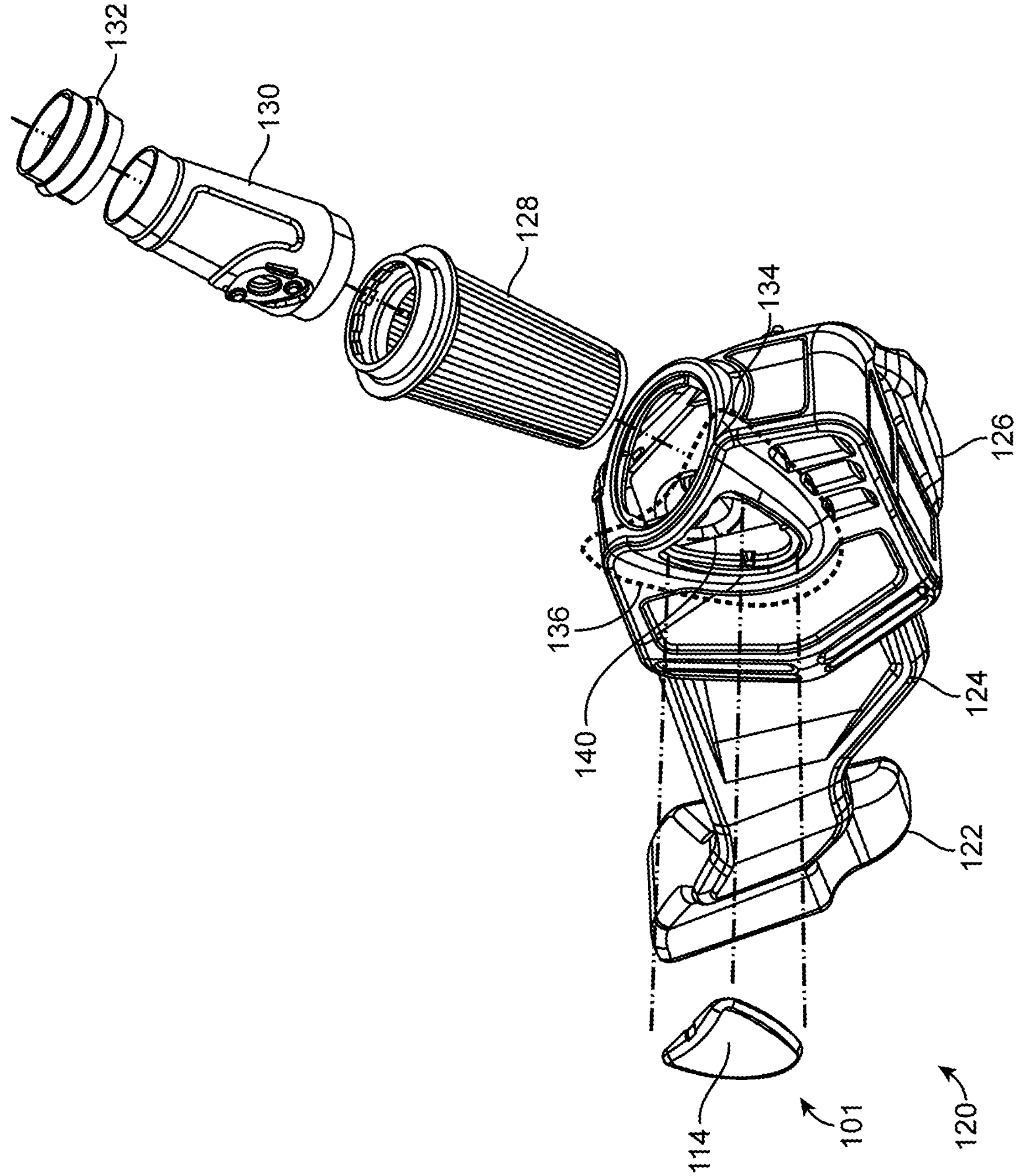
FIG. 2 is a perspective view of a partially disassembled air intake system showing an airbox assembly, a window assembly, and an air filter.

As shown in FIG. 2, airbox 126 has an airbox aperture 140 that receives and mates with the window assembly 101 as discussed in detail below. The airbox 126 is adapted to receive and secure air filter 128. The airbox 126 is configured to accept cold air 12 from the cold air intake 122, direct the air though a filter 128, and provide filtered air 14 through the tube 130 to the internal combustion engine 10. Other components for installing the air intake system 120 into a vehicle and coupling to an engine 10, such as the turbo adapter 132 for coupling the air intake system 120 to the engine 10, are contemplated in one or more embodiments.

Figure 3:
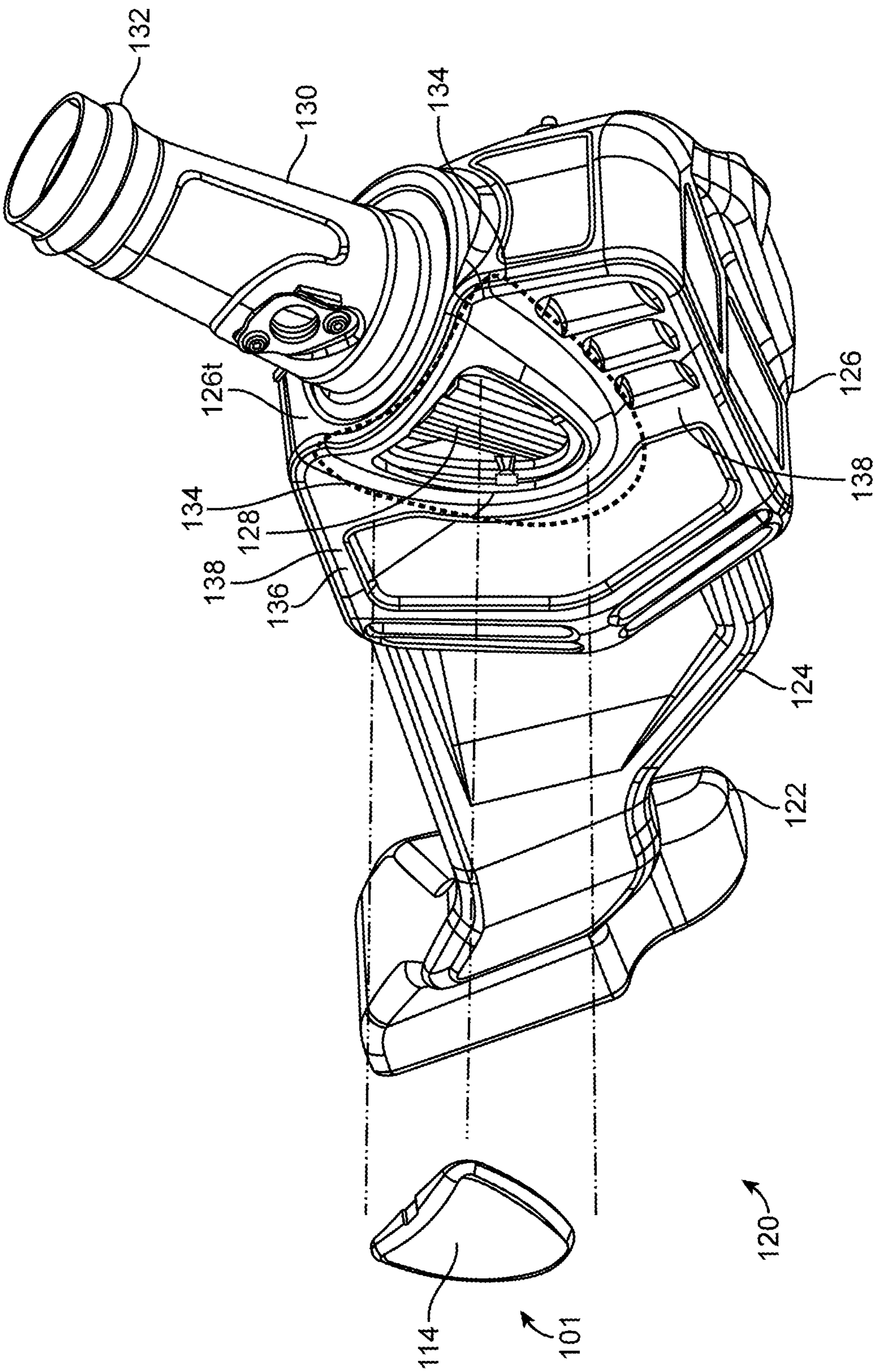
FIG. 3 is a perspective view of a partially disassembled air intake system showing the airbox assembly and the window assembly.

FIG. 3 is a perspective view of a partially disassembled air intake system 120 showing the window assembly 101 removed from the airbox 126. FIGS. 1 and 3 illustrate how a user may inspect the condition of the air filter 128. As shown in FIG. 1, when the window assembly 101 provides an unobstructed view of the filter 128, a user may inspect the filter 128 simply by viewing the filter 128 through the transparent window assembly 101. If, however, the window assembly 101 is obstructed by contaminants, the user may simply remove the window assembly 101 from the airbox 126 by separating the magnetic connections. The user then views the air filter 128 directly and may clean the contaminants from the window assembly 101 before reassembly.

In addition to providing a convenient means for a user to inspect the air filter 128, the air intake system 120 also provides several vehicle performance benefits to the user. First, the engine 10 will exhibit better performance in terms of increased horsepower, torque, and fuel efficiency. Second, embodiments also exhibit the sound of cold air rushing into the combustion chamber of the engine 10 during startup and acceleration exhibited by cold air intake systems. And third, a user may remove the window assembly 101 from the air intake system 120 while racing to obtain better engine 10 performance as a result of increased air flow being fed to the engine 10.

FIGS. 1-4 illustrate that at least a portion 134 of the outer surface 136 the airbox 126 and the outer surface 114 of the window assembly 101 may be contoured around the air filter 128. A contoured airbox 126 and window assembly 101 exposes a greater radial outer surface of the air-filter 128 than would, for example, a flat, non-contoured airbox 126 and window assembly 101. As many air filters 128 are pleated, an enhanced radial view facilitated by one or more embodiments allows the users to inspect multiple pleats of the air filter 128, including inspecting the recesses of multiple pleats. Hence, a properly contoured airbox 126 and window assembly 101 provides the user with an improved view of the air filter 128.

Figure 4:
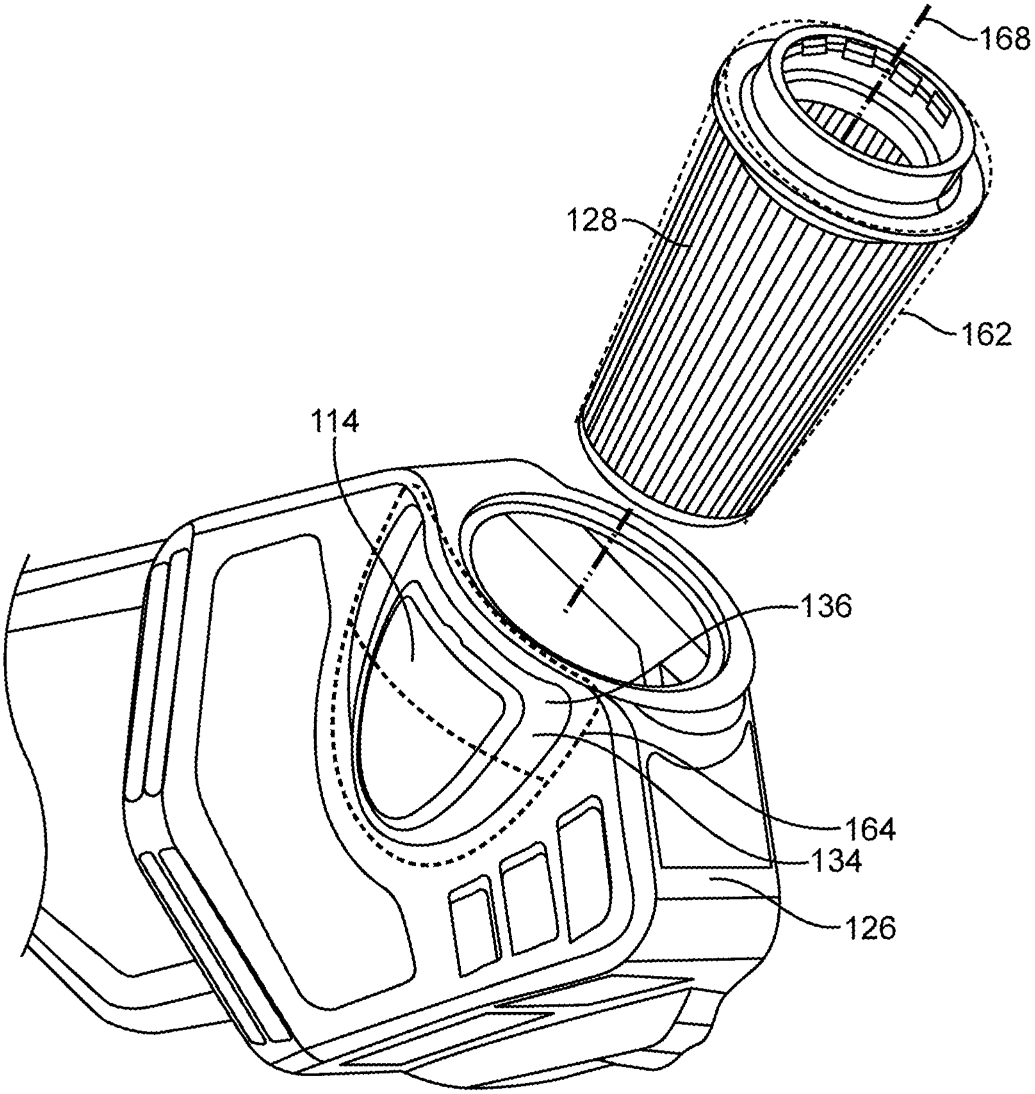
FIG. 4 is a perspective view of a partially disassembled air intake system showing the shape of the conically tapered contours of the airbox assembly and the window assembly.

Many commercially available automobile air filters 128 are conically tapered, where the radius from the central axis 168 of an air filter 128 to the outer surface of the filter 128 varies along the axis 168 of the filter 128. In a preferred embodiment, as shown in FIG. 4, the portion 134 of the outer surface 136 of the airbox 126 proximal to the aperture 140 is contoured to form a partial conical taper 164 approximately equidistant from the filter conical taper 162. Likewise, the outer surface 114 is also contoured to form a partial conical taper 164 approximately equidistant from the filter conical taper 162. In an embodiment, the window assembly 101 and the airbox may not be contoured or shaped based on the shape of the air filter.

As shown in FIG. 3, the contour 164 of the outer surface 134 may be formed in a portion 136 of the airbox 126. Outside the contoured portion 136, other surfaces 138 may be formed to address other aspects of the air intake assembly 120, such as shaping the air intake assembly 120 to fit within the engine cavity of the vehicle.

In a preferred embodiment, the airbox aperture 140 (and also the window assembly 101) are positioned proximal to the top of the airbox 126 near the tube 130 for directing filtered air 14 to the internal combustion engine 10. The placement of the aperture 140 and the window assembly 101 exposes the upper portion of the air filter 128 closer to the tube 130 so that a larger area of the filter 128 may be inspected.

Figure 5:
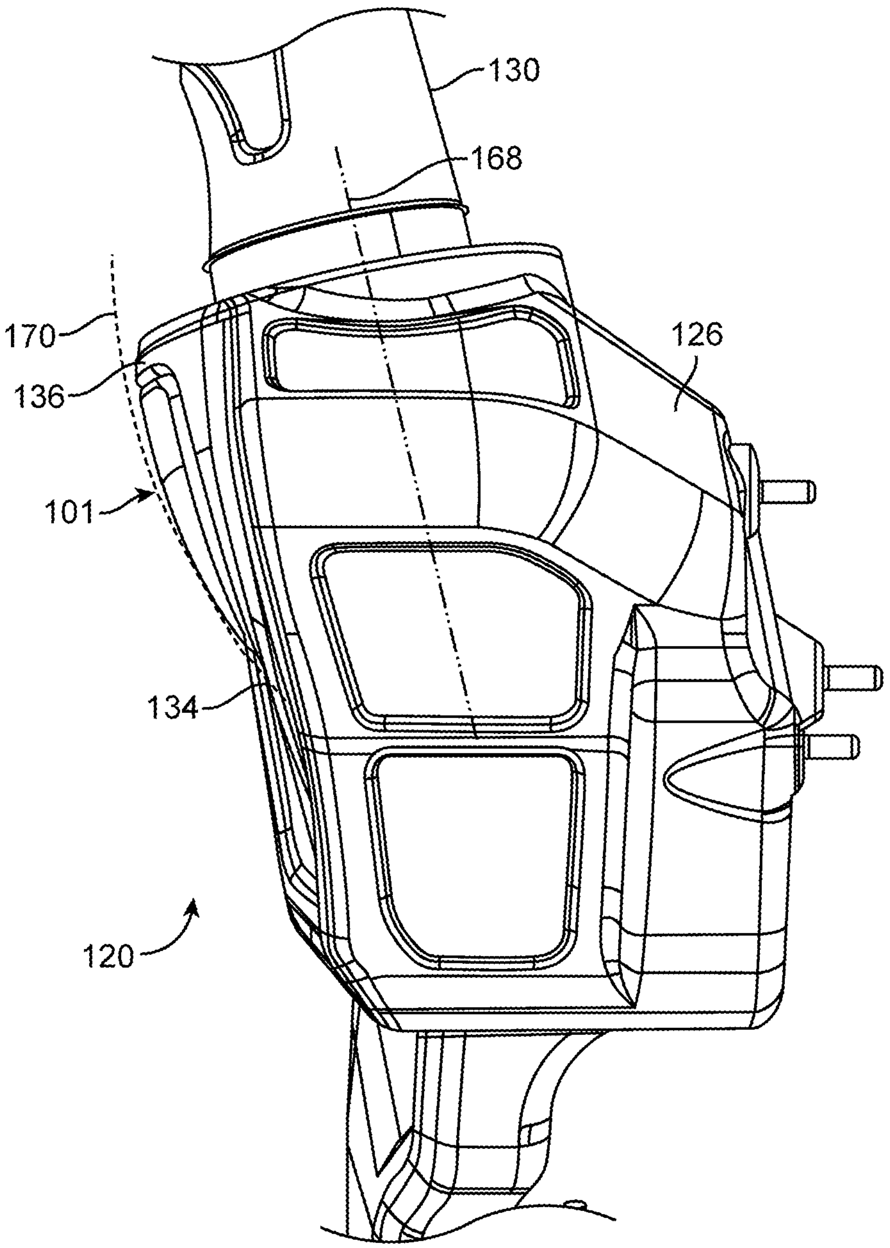
FIG. 5 is a side view of the air intake system showing the conically tapered contours of the airbox assembly and the window assembly.

FIG. 5 is a perspective, side view of the air intake system 120 showing the vertical contour taper 170 (i.e., the taper of the window assembly 101 and airbox 126). The vertical contour taper 170 may have a convex taper relative to the axis 168 of the air filter 128. Other vertical contour tapers 170 shapes, such conically tapered with a linear taper or a concave taper, are contemplated in one or more embodiments.

Figure 6:
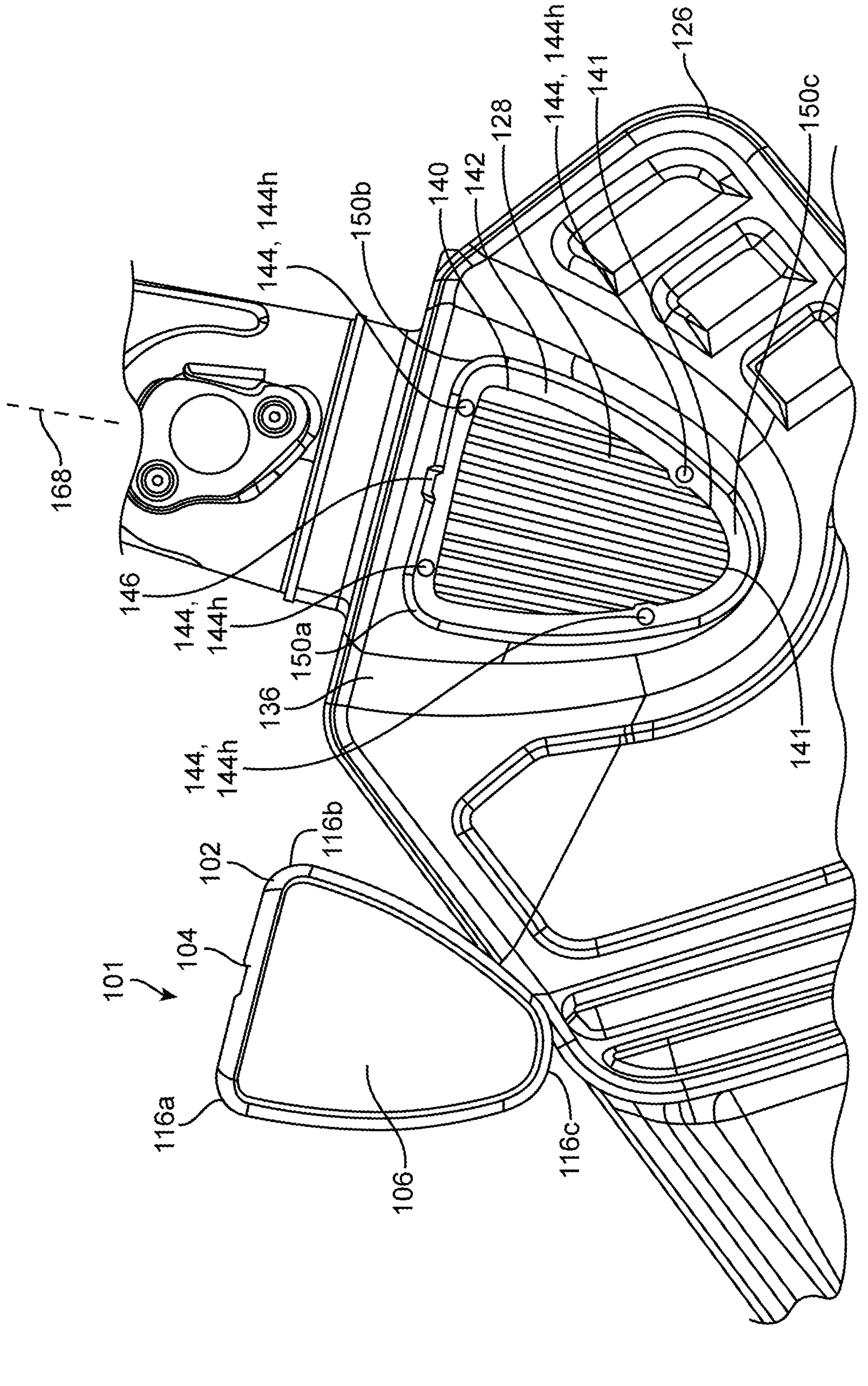
FIG. 6 is a perspective view of the partially disassembled view of the air intake assembly showing detail of the airbox aperture and the filer window assembly.
Figure 7:
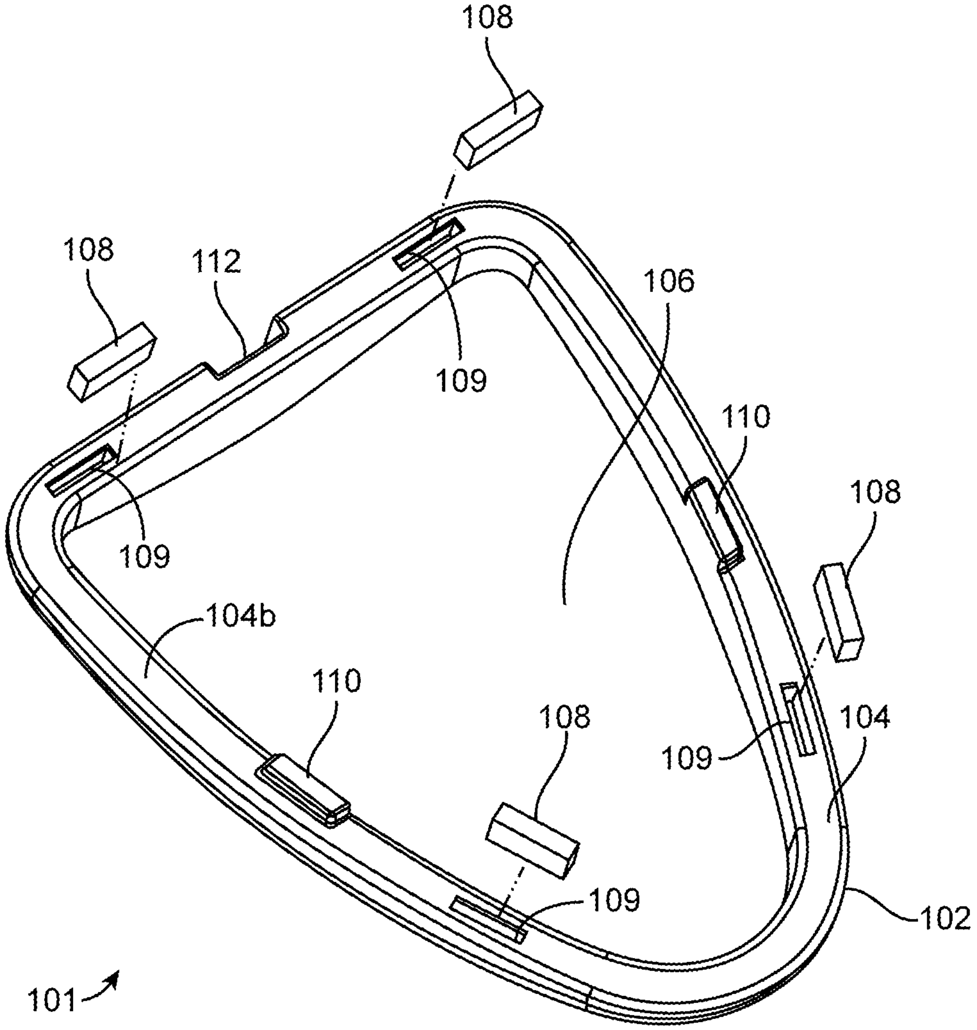
FIG. 7 is a perspective view of the back surface of the window assembly.

FIGS. 6-7 illustrate details of the window assembly 101 and the region near the aperture 140 on the airbox 126. As shown in FIG. 6, an aperture 140 is formed in the airbox 126 which, as will be discussed below, is sized to receive the window assembly 101. The aperture 126 is shaped as an isosceles triangle having radius corners 150*a*, 150*b*, and 150*c*. The shape of the aperture 140 (as well as the corresponding window assembly 101) may enable the user to attach the window assembly 101 to the airbox 126 more easily, particularly in a cramped engine compartment where the user may have to reattached the window assembly "by feel." A window notch 112 is formed in the window frame 104 to facilitate the separation of the window assembly 101 to the airbox 126.

Turning attention to the airbox 126, surrounding the perimeter 141 of the aperture 140, a recess 142 is sized and formed in the airbox 126 such that the recess 142 is setback inward from the outer surface 136 of the airbox 126 toward the center axis 168 of the filter 128. Hence, the recess 142 surrounds the aperture perimeter 141 of the airbox aperture 14, where the recess 142 is shaped to receive and surround the window assembly 101 such that the outer surface 114 of the window housing 102 is generally flush with the airbox outer surface 136 of a portion 134 of the airbox 126 proximal to the aperture 140. An aperture notch 146 is formed proximal to the aperture 140 to facilitate the separation of the window assembly 101 to the airbox 126.

Referring to FIGS. 6 and 7, the window assembly 101 comprises a window housing 102 and a plurality of magnets 108 or other magnetic material placed on the bottom of the window assembly in an embodiment. The window housing 102 may be comprised of two components: (1) an opaque outer window frame 104 and (2) a transparent window 106. The window frame 104 surrounds the transparent window 106.

In an embodiment, one or more keyways 110 are formed on the window housing 102, such that the keyways 110 are positioned and shaped to align the window assembly 101 with the airbox aperture 140 as the window assembly 101 is placed onto the airbox 126.

The window assembly 101 may be releasable secured in place to the airbox 126 through fastening means such as by employing magnetized materials such as magnetics and metals. Metal or metal alloys containing iron, cobalt, and nickel for example are attracted to magnetic fields sufficiently strong to be considered magnetic. Magnets are objects that produce a magnetic field that can attract some metal or metal alloys, or attract other magnets.

In an embodiment, a plurality of discrete magnets 108 are placed within the window frame 104 of the window assembly 101. The magnets 108 may be placed in magnet recesses 109 so that the bottom surface 104*b* of the window frame 104 is flush. Similarly, metal plugs 144 are placed in the recess 142 of the airbox 126 and are positioned to align with and attract the corresponding magnet 108 in the window frame 104. The metal plugs may be placed into holes 144*h* formed in the recess 142, or may be embedded within the recess 142.

In an embodiment, a first type of magnetic material secured to the window frame 104, and a second type of magnetic material secured proximal to a perimeter 139 of the airbox aperture 140 of the airbox 126. The first type of magnetic material is magnetically attracted to the second type of magnetic material. As can be appreciated, there are various combinations of magnetized materials that can be employed to produce a fastening means through magnetism, such as combinations or metal to magnets, magnet having a North or South pole to another magnet having a South or North pole respectively.

Figure 8:
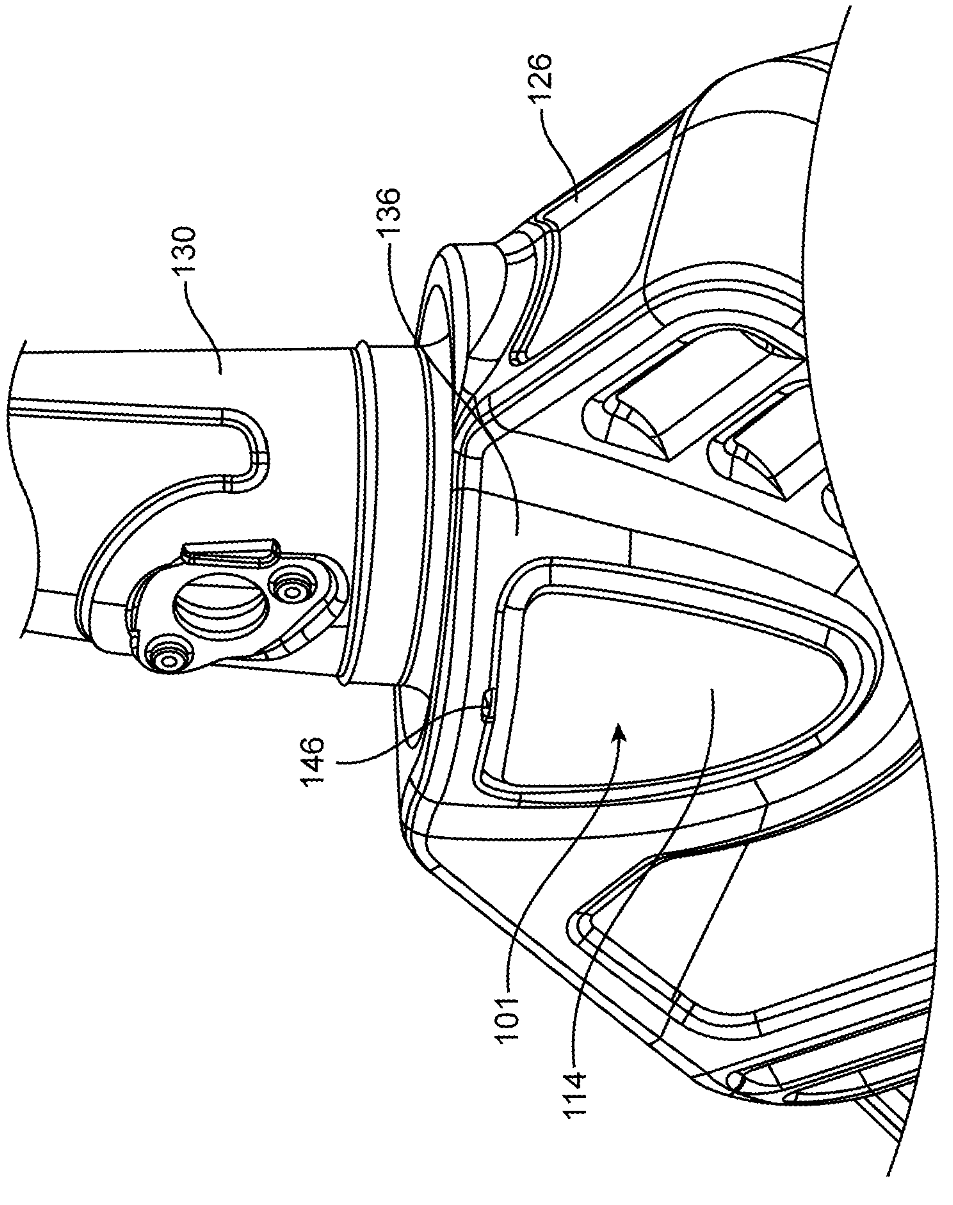
FIG. 8 is a perspective view of the assembled air intake system.

FIG. 8 is a perspective view of the assembled air intake system 120. As discussed above, the outer surface 114 of the window assembly 114 is flush with the outer surface 136 of the airbox 126 proximal to the aperture. Aperture notch 146 formed in the airbox 126 facilitates the removal of the window assembly 101 from the airbox 126.

Although the invention has been discussed with reference to specific embodiments, it is apparent and should be understood that the concept can be otherwise embodied to achieve the advantages discussed. The preferred embodiments above have been described primarily as an air intake system having a transparent, removable window assembly for viewing the air filter. In this regard, the foregoing description of the air intake system is presented for purposes of illustration and description. It shall be apparent that other types of equipment would benefit from the aspects of the air intake system.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. An air intake system for an internal combustion engine, the air intake system comprising:

a cold air intake for receiving cold air;

a tube for directing filtered air to an internal combustion engine;

an airbox having an airbox aperture, the airbox adapted to receive and secure a conically-tapered filter having an outer surface, the outer surface of the filter having a radius which varies along a filter axis, the airbox configured to accept cold air from the cold air intake, direct the air though a filter, and provide filtered air through the tube leading to the internal combustion engine; and, a removable window assembly configured to be received by and releasably attach to the airbox aperture of the airbox, wherein:

a portion of the outer surface of the airbox proximal to the aperture and a window outer surface of the window assembly are contoured forming a partial conical taper which varies along the filter axis, the partial conical taper is approximately equidistant from the outer surface of the filter.

2. The air intake system for the internal combustion engine of claim 1, wherein the window assembly comprises:

a window housing comprising a window frame and a transparent window, the window frame surrounding the transparent window;

a first type of magnetic material secured to the window frame; and, the airbox further comprises a second type of magnetic material secured proximal to a perimeter of the airbox aperture of the airbox; the first type of magnetic material is magnetically attracted to the second type of magnetic material.

3. The air intake system for the internal combustion engine of claim 2, wherein:

the first type of magnetic material secured to the window frame comprises a plurality of discrete magnets secured to the window frame; and, the second type of magnetic material secured proximal to the perimeter of the airbox aperture comprises a plurality of metal plugs formed proximal to the perimeter of the airbox aperture;

wherein each metal plug of a plurality of the metal plugs formed on the airbox are positioned to align with and magnetically attract a corresponding discrete magnet of the plurality of discrete magnets when the airbox receives and secures the window assembly in place.

4. The air intake system for the internal combustion engine of claim 1, wherein the airbox further comprises a recess surrounding an aperture perimeter of the airbox aperture, the recess shaped to receive and surround the window assembly such that the outer surface of the window housing is generally flush with the airbox outer surface of a portion of the airbox proximal to the airbox aperture.

5. The air intake system for the internal combustion engine of claim 1, wherein the airbox aperture is positioned near a top of the airbox proximal to the tube for directing filtered air to the internal combustion engine.

6. The air intake system for the internal combustion engine of claim 1, wherein the airbox aperture and window assembly are shaped as an isosceles triangle having radiused corners.

7. The air intake system for the internal combustion engine of claim 1, wherein one or more keyways are formed on the window housing, the keyways shaped to align the window assembly with the airbox aperture as the window assembly is placed onto the airbox.

8. The air intake system for the internal combustion engine of claim 1, wherein the air intake system is an aftermarket product.

9. The air intake system for the internal combustion engine of claim 1, wherein the air intake system is customized for specific automobiles.

10. The air intake system for the internal combustion engine of claim 1, wherein a window notch is formed in the window assembly and an aperture notch is formed proximal to the aperture to facilitate the separation of the window assembly to the airbox.

11. An air intake system for an internal combustion engine, the air intake system comprising:

a cold air intake for receiving cold air;

a tube for directing filtered air to an internal combustion engine;

an airbox having an airbox aperture, the airbox adapted to receive and secure a filter having an outer surface, the outer surface of the filter having a radius about a filter axis, the airbox configured to accept air from the cold air intake, direct the air though a filter, and provide filtered air through the tube to the internal combustion engine; and, a removable window assembly configured to releasably attach to the airbox aperture of the airbox;

wherein:

a portion of the outer surface of the airbox proximal to the aperture and a window outer surface of the window assembly are contoured and are approximately equidistant from the outer surface of the filter.

12. The air intake system for the internal combustion engine of claim 11, wherein the window assembly comprises:

a window housing comprising a window frame and a transparent window, the window frame surrounding the transparent window;

a first type of magnetic material secured to the window frame;

the airbox further comprises a second type of magnetic material secured proximal to a perimeter of the airbox aperture of the airbox; and, the first type of magnetic material is magnetically attracted to the second type of magnetic material.

13. The air intake system for the internal combustion engine of claim 12, wherein:

the first type of magnetic material secured to the window frame comprises a plurality of discrete magnets secured to the window frame;

the second type of magnetic material secured proximal to the perimeter of the airbox aperture comprises a plurality of metal plugs formed proximal to the perimeter of the airbox aperture;

each metal plug of a plurality of the metal plugs formed on the airbox are positioned to align with and magnetically attract a corresponding discrete magnet of the plurality of discrete magnets when the airbox receives and secures the window assembly in place.

14. The air intake system for the internal combustion engine of claim 11, wherein the airbox further comprises a recess surrounding the aperture perimeter of the airbox aperture, the recess shaped to receive and surround the window assembly such that the outer surface of the window housing is generally flush with the airbox outer surface of a portion of the airbox proximal to the aperture.

15. The air intake system for the internal combustion engine of claim 11, wherein the airbox aperture is positioned near a top of the airbox proximal to the tube for directing filtered air to the internal combustion engine.

16. The air intake system for the internal combustion engine of claim 11, wherein one or more keyways are formed on the window housing, the keyways shaped to align the window assembly with the airbox aperture as the window assembly is placed onto the airbox.

17. The air intake system for the internal combustion engine of claim 11, wherein the air intake system is an aftermarket product.

18. The air intake system for the internal combustion engine of claim 11, wherein the air intake system is customized for specific automobiles.

19. The air intake system for the internal combustion engine of claim 11, wherein a window notch is formed in the window assembly and an aperture notch is formed proximal to the aperture to facilitate the separation of the window assembly to the airbox.

20. An air intake system for an internal combustion engine, the air intake system comprising:

a cold air intake for receiving cold air;

a tube for directing filtered air to an internal combustion engine;

an airbox having an airbox aperture positioned proximal to a top a of the airbox near the tube for directing filtered air to the internal combustion engine, the airbox adapted to receive and secure a conically-tapered filter, the airbox configured to accept air from the cold air intake, direct the air though a filter, and provide filtered air through the tube leading to the internal combustion engine; and, a removable window assembly configured to be received by and releasably attach to the airbox aperture of the airbox, the window assembly having a window housing comprising a window frame and a transparent window, the window frame surrounding the transparent window;

wherein:

a portion of the outer surface of the airbox proximal to the aperture and a window outer surface of the window housing are contoured forming a partial conical taper approximately equidistant from the filter conical taper, the airbox further comprises a recess surrounding the aperture perimeter of the airbox aperture, the recess shaped to receive and surround the window assembly such that the outer surface of the window housing is generally flush with the airbox outer surface of a portion of the airbox proximal to the aperture, a window notch is formed in the window assembly and an aperture notch is formed proximal to the aperture to facilitate the separation of the window assembly to the airbox, and the air intake system is an aftermarket product.

* * * * *